United States Patent
Catalano

(10) Patent No.: US 9,978,109 B1
(45) Date of Patent: May 22, 2018

(54) METHOD AND SYSTEM FOR A MOBILE COMPUTERIZED MULTIPLE FUNCTION REAL ESTATE BROKERS ASSISTANT

(71) Applicant: Donald Charles Catalano, Smithtown, NY (US)

(72) Inventor: Donald Charles Catalano, Smithtown, NY (US)

(*) Notice: Subject to any disclaimer, the term of this patent is extended or adjusted under 35 U.S.C. 154(b) by 78 days.

(21) Appl. No.: 13/844,291

(22) Filed: Mar. 15, 2013

Related U.S. Application Data

(63) Continuation-in-part of application No. 13/103,485, filed on May 9, 2011.

(60) Provisional application No. 61/473,139, filed on Apr. 7, 2011, provisional application No. 61/621,077, filed on Apr. 6, 2012, provisional application No. 61/794,372, filed on Mar. 15, 2013.

(51) Int. Cl.
  *G06Q 40/00* (2012.01)
  *G06Q 50/16* (2012.01)
  *G06F 3/0484* (2013.01)

(52) U.S. Cl.
  CPC ......... *G06Q 50/16* (2013.01); *G06F 3/04842* (2013.01)

(58) Field of Classification Search
  CPC .................................................... G06Q 50/16
  See application file for complete search history.

(56) References Cited

U.S. PATENT DOCUMENTS

| | | | |
|---|---|---|---|
| 7,076,452 B2* | 7/2006 | Florance et al. | 705/26.43 |
| 8,346,796 B2* | 1/2013 | Kardell | G06F 17/3087 707/609 |
| 2007/0100644 A1* | 5/2007 | Keillor | G06Q 50/16 705/313 |
| 2007/0214073 A1* | 9/2007 | Smith | G06Q 40/06 705/36 R |
| 2008/0103908 A1* | 5/2008 | Munk | G06Q 30/02 705/14.72 |
| 2009/0248587 A1* | 10/2009 | Van Buskirk | 705/80 |
| 2009/0327163 A1* | 12/2009 | Swan et al. | 705/400 |
| 2011/0295640 A1* | 12/2011 | Valentini et al. | 705/7.19 |
| 2012/0254156 A1* | 10/2012 | Rao | 707/722 |
| 2012/0290391 A1* | 11/2012 | Rao | 705/14.53 |

* cited by examiner

*Primary Examiner* — Scott S Trotter
(74) *Attorney, Agent, or Firm* — Stephen E. Zweig

(57) ABSTRACT

An integrated computerized method, oriented to mobile computerized devices such as tablet computers and Smartphone's, for assisting real estate brokers in conducting client site visits and tours to various real properties of interest and/or the client by themselves in visiting and touring various real estate properties of interest. The method comprises various software modules, including software modules to assist in various numeric comparative property evaluation schemes, modules to automatically present building floor plans and other information at defined tour locations, and modules to show images or CAD drawings of proposed property modifications (often using augmented reality techniques). Other modules may additionally help manage the tour, including semi-automatic notification of tour itinerary changes, management of tour route instructions, and audio or text narration during selected portions of the tour.

28 Claims, 11 Drawing Sheets

METHOD AND SYSTEM FOR A MOBILE COMPUTERIZED MULTIPLE FUNCTION REAL ESTATE BROKERS ASSISTANT

CROSS REFERENCE TO RELATED APPLICATIONS

This application claims the priority benefit of provisional patent application 61/621,077, "METHOD AND SYSTEM FOR A MOBILE COMPUTERIZED MULTIPLE FUNCTION REAL ESTATE BROKER'S ASSISTANT", inventor Donald Charles Catalano, filed Apr. 6, 2012; this application is also a continuation in part of copending application Ser. No. 13/103,485 entitled "SYSTEM AND METHOD OF MANAGING AND OPTIMIZING COMMERCIAL REAL ESTATE LEASES", inventor Donald Charles Catalano, filed May 9, 2011; application Ser. No. 13/103,485 in turn claimed the priority benefit of provisional application 61/473,139 entitled "SYSTEM AND METHOD OF MANAGING COMMERCIAL REAL ESTATE LEASES", inventor Donald Charles Catalano, filed Apr. 7, 2011; this application also claims the priority benefit of provisional application 61/794,372 entitled "Reoptimizer Walkthrough", inventor Donald Charles Catalano, filed Mar. 15, 2013; the contents of all of these applications are incorporated herein by reference.

BACKGROUND OF THE INVENTION

Field of the Invention

This invention is in the field of software and systems for managing real estate management and real estate transactions.

Description of the Related Art

Real estate brokers and/or their clients spend a considerable amount of time evaluating various real estate properties of interest to the client. Among other activities, they need to better define which property characteristics are most important to their client's respective needs. Such evaluation methods, which are typically based on helping to define and standardize various evaluation criteria, and then further helping to define and rate the relative importance of these criteria, were discussed in detail in parent application Ser. No. 13/103,485, the contents of which are incorporated herein by reference. In this parent patent application, these evaluation criteria were often referred to as "Key Site Driver numeric descriptors", which were ranked according to "Key Site Variables". A final property ranking was defined according to a "Key Site Driver function" ultimately producing a "Key Site Driver number" (here occasionally referred to in the alternative as a Key Site Rating or KSR number). This ultimate number was useful in helping both the broker and client compare the relative merit of various properties. "Key Site Drivers" were often referred to in abbreviated form as KSD, and this terminology will be used in this application as well.

Real estate brokers do other activities as well. For example, they also often spend a considerable amount of time taking clients through physical (real world) tours of various real properties of interest. Such tours are often logistically demanding. In a typical day tour, often a number of different properties of interest will be covered, and thus the broker must first construct a tour itinerary covering visits to these multiple properties. Additionally, such property visits usually have to be coordinated with other brokers, owners, or managers of the visited property. This is because these other brokers, owners, or managers often wish to be on hand to help explain the particular features of their particular property.

These tours often do not go exactly according to the previously established itinerary. Traffic, unpredictable client interest or disinterest in a particular property, changes in client schedules, and the like, can often crop up unpredictably. As a result, tour itineraries must often be dynamically altered as the tour progresses. This generates additional work. For example, during a tour, a broker or broker's assistant must often spend time on a cell phone rescheduling visit times. As a result, methods to reduce the labor involved in such tours, or the efficiency of such tours, are highly useful for this field.

In many cases, the client may seek to remodel or otherwise modify the present configuration of the property. For example, the client may wish to move walls, add walls, add additional fixtures, or change landscaping. To facilitate this, often the showing broker or the property brokers/managers often provide images or computer aided design (CAD) drawings of these proposed changes. However often clients have trouble fully visualizing these proposed changes. Various methods have been proposed to assist in some of these broker activities. For example, Lamont, in U.S. Pat. Nos. 7,652,594 and 8,072,353 proposed a dynamic content design and delivery software architecture for providing location specific information to users in the field.

Blumberg, in U.S. Pat. Nos. 6,385,541; 6,496,766 and 7,072,665 proposed a wireless position-based information access device and method of searching that would provide location-centric information from a more distant information system, and communicate this to the user.

Imamura, in U.S. Pat. No. 7,080,096 proposed a housing space-related commodity sale assisting system, method, program and recordable program media. The system could provide real estate floor plans and other information to prospective clients.

Morse, in U.S. Pat. No. 7,392,208 proposed an electronic property viewing method for providing virtual tours of real estate via a public communications network.

One drawback of such prior art systems is that they tended to be dependent on having an active connection to the Internet for usage. As any mobile phone user can attest, dropped calls, and dropped Internet connections are a daily reality. This is especially compounded a mobile wireless device user first enters a building, and then tries to rapidly establish an Internet connection. Additionally, if large amounts of data need to be rapidly accessed, delay times due to the limiting speeds of wireless connections can also tend to detract from the utility of such electronic methods.

Thus, in spite of the various prior art in the area, a real estate brokerage and/or end-user client retains many tedious and time-consuming elements, and further automation in this field would be highly useful.

BRIEF SUMMARY OF THE INVENTION

The invention is based, in part, on the insight that despite previous automation efforts, many of the real estate transaction and management functions which are carried out by various individuals such as human real estate brokers, real estate broker's assistants and/or the end-users (clients) of the real estate are inherently capable of more effective automation. Because data often must be rapidly passed from one person to another and from one use to another, methods of increased integration between these various activities is also desirable.

As previously discussed, real estate brokers spend a considerable amount of time helping clients evaluate various real estate properties of interest, and helping to clients better define which property characteristics are most important. In addition, the clients themselves can spend an inordinate amount of time getting selecting the best comps, especially when, as is often the case, there are multiple stakeholders involved in the decision. In this disclosure, the Key Site Driver concepts previously discussed in detail in parent application Ser. No. 13/103,485, the contents of which are incorporated herein by reference are further extended and become invaluable to both the real estate brokers assisting the client, and the client themselves.

Although the methods disclosed in the present disclosure generally adopt and affirms the KSD teaching of Ser. No. 13/103,485, the present disclosure further extends the basic KSD concepts to further include leasing and non-leasing (e.g. purchase, management) functions. The scope of the KSD concepts are also further expanded to further include both commercial real property, residential real property, and even unimproved land type real property. Indeed, in some cases, which will be discussed in more detail in subsequent disclosures, the KSD concept may be further extended to further include client rakings of landlords, managers, or brokers for such real property as well.

The invention is also based on the insight that although clients and brokers can of course understand and alter various KSD criteria and functions while not being physically present at any particular real property of interest, in many situations, it is useful to perform such KSD evaluations while the client or broker is physically visiting the property. This way, details that might not otherwise be apparent from photos, videos, written descriptions and statistics can become evident, and this in turn can result in more satisfactory property KSD rankings. Thus it is useful to provide methods, devices, and systems that facilitate such on-site rankings.

Further, as previously discussed, real estate brokers and/or the end-user clients typically go through a considerable amount of time and effort conducing clients through real-world tours of various real estate sites. Here previous efforts to simplify and automate the process have not been fully successful, and further advances in automated methods to reduce this workload would be useful.

The invention is also based on the insight that expanded mapping and automated tour assistance functionality is also desirable. During real estate tours, real estate brokers and/or the clients should, of course, know the relative location of the various properties on a map. This allows the real estate broker to actually show these properties to the client, and/or for the client themselves to visit the various properties. Ideally, however, an improved system would also determine an efficient, multiple destination, tour route that not only includes these various locations, but other locations as well. Other locations are also desirable because real estate tours often have to accommodate other places of interest, such as restaurants or nearby facilities (e.g. transportation facilities, local employee housing, recreational facilities and the like). Further, the tour itinerary may often dynamically change during a tour (e.g. depending on traffic and changes in client interest or schedule), and these changes should ideally also be managed by the system. Additionally, the broker is often expected to be a source of useful information on the area, and will often give clients a running narrative of such useful information while driving in route to the next tour destination. Thus additional methods to automate or at least partially automate these functions would also be useful.

The invention is also based, in part, on the further insight that prior art methods to assist clients in evaluating between multiple real estate properties, and/or various types of improvements in these multiple real estate properties, are also inadequate. For example, for both commercial and residential real estate, when the properties are buildings, each building will have its own building floor plan, and if the building has multiple stories (levels, floors), each level will have its own particular level floor plan. Some sections of these buildings or building levels may be of interest to the client (perhaps because they are available for lease or sale), while other sections may not be of interest. As the client tours each portion of the property of interest, the broker should ideally provide the client with a graphical representation of the floor plan or other layout of that property. This requires juggling information pertaining to these various floor plans. Generally, the quicker that this information can be provided to a client at the exact time that the client wants it, the better.

Additionally, as previously discussed, in many cases, the client may seek to remodel or otherwise modify the present configuration of the property (e.g. moving walls, changing landscaping). Although often brokers, landlords, or managers may provide images or computer aided design (CAD) drawings of these proposed changes, clients often have difficulty looking at a property, and then imagining the ultimate impact of these proposed changes to the property. Thus methods to assist in this property modification imagination or visualization process, such as various augmented reality methods, would also be of considerable use and commercial importance in this area, and here such concepts are explored in more detail.

As will be discussed, such augmented reality methods can be particularly useful as one component of an integrated multiple function automated real estate broker system. In the invention's integrated method and system for example, clients may evaluate multiple sites, compare many different factors, and also use augmented reality to better understand how each site would be customized to meet that client's particular needs.

The invention is also based, in part, on the insight that modern mobile computerized devices, either on a stand-alone basis, or as part of a wireless networked system with various other computer servers, now have sufficient computing power and storage capacity to perform many of the above desired functions. Thus methods and systems that implement, either singly or preferably as an integrated system, one or more of the above concepts would be highly useful in the real estate field.

DETAILED DESCRIPTION OF THE INVENTION

Abbreviation: In this specification, the word "comp" is used as an abbreviation of "comparable", which is typically a property that the client or broker wishes to use to compare to an ideal or reference property.

Nomenclature: In this specification, the overall numeric Key Site Driver rating previously discussed in specification Ser. No. 13/103,485 is occasionally discussed here in the alternative as a KSR rating in order to more clearly distinguish the function of the various individual Key Site Driver variables from the overall function of the various Key Site Driver variables.

Figure 1:
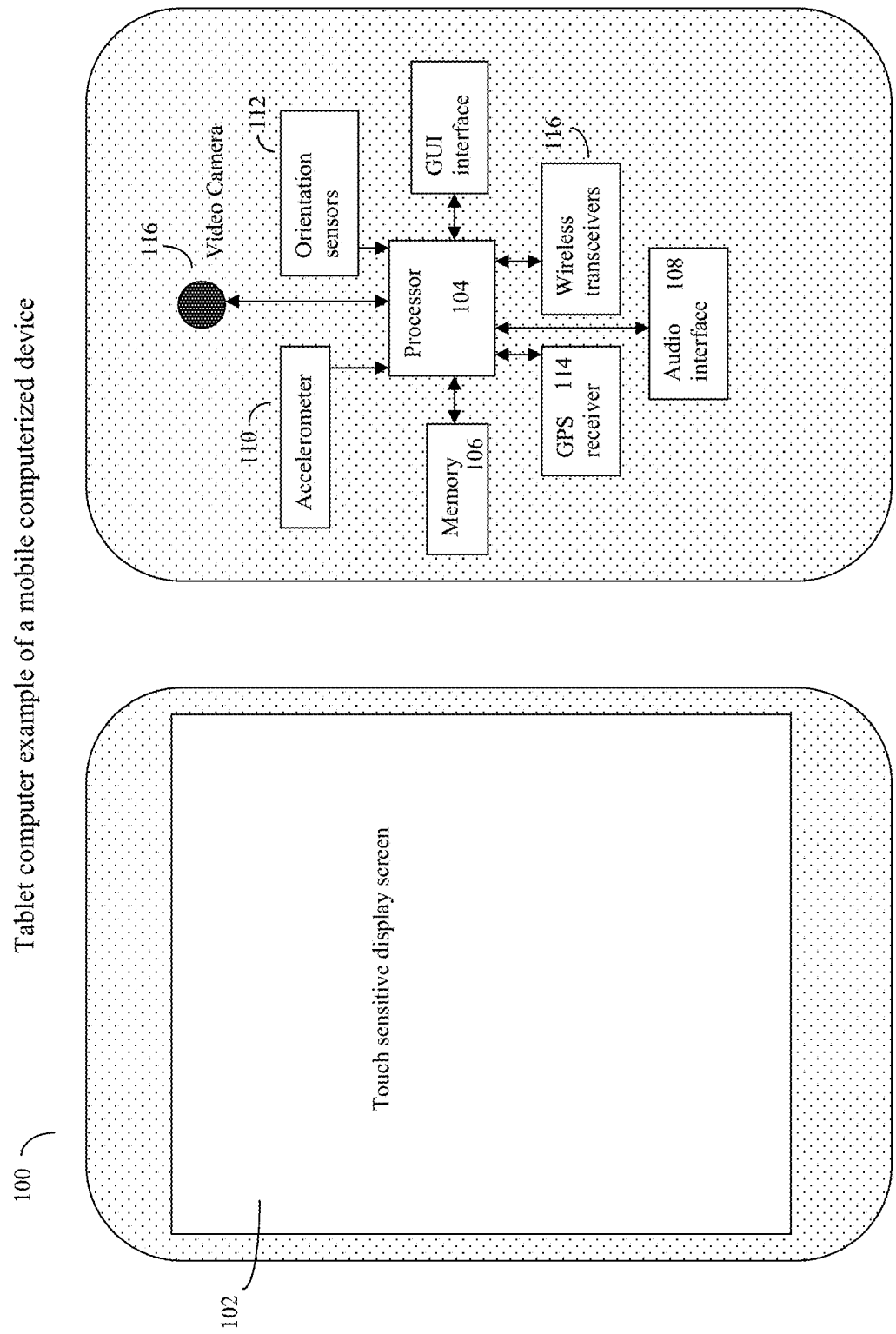
FIG. 1 shows an example of a tablet computer type mobile computerized device that may be used to execute the method's various software functions.

FIG. 1 shows an overview of a typical mobile computerized device that will be used to implement the system.

In some embodiments of the invention, the computerized device (100) may be a tablet or cellular phone computerized device, exemplified by the popular Apple iPad and iPhone devices, the Android cellular phone and tablet devices, and the Microsoft family of tablet computers and mobile devices. In general, such devices normally comprise a high-resolution display screen (102), often equipped with touch sensors, which often functions as the primary or secondary graphical user interface for the device. The devices additionally usually comprise at least one processor (104) (which may have one or more cores and graphics units), memory (106) (often approximately in the gigabyte range or higher), speakers or audio output jacks (108), microphones or audio input jacks. The devices often also comprise various accelerometers (110) or other types of motion and position sensors (112) capable of detecting device movement and orientation on the local scale. The devices also often comprise Global Positioning Receivers (114) capable of with, at least when supplemented by optional wireless signals from the Wide Area Augmentation System (WAAS), to pinpointing device position to an accuracy within a few feet or better. The devices may also comprise video cameras (116).

Such devices additionally often comprise one or more wireless transceivers (116). These wireless transceivers can include cellular phone transceivers (e.g. 3G or 4G transceivers), WiFi transceivers, Bluetooth™ transceivers and the like. In some embodiments, these transceivers can in turn provide device connectivity to the Internet, and hence to various servers throughout the world.

Nowadays these same portable devices, along with laptops and desktops, are capable of highly accurate voice recognition as well. The level of accuracy has most recently improved to finally allow functional control and interaction with the host computer through voice control alone. In some embodiments, the system may be configured to operate by voice control, at least as an optional user input method.

The invention will thus typically consist of various computerized methods that are implemented in software, often as various software modules. In some embodiments, all of the invention's software may be loaded onto the mobile computerized device, and once loaded with data, the device and software will then be capable of performing most or all of the functions discussed herein as a stand-alone device (e.g. without the assistance of wirelessly connected remote computer servers). Such stand-alone capability is useful, as real estate tours often cross into areas, both within buildings and between buildings, where wireless connectivity to the Internet is not always either instantly available or reliable. In other embodiments, however some of the various software functions or modules may be offloaded to one or more remote servers, which can communicate with the mobile computerized device via wireless data links (e.g. 3G or 4G wireless cellular phone links, WiFi links, and so on, often through the Internet).

In general, the more software modules and functions that the system performs, the better. Although for clarity, the individual software modules that may make up the system are often discussed in this specification separately, it should be understood that in a preferred embodiment, often a number of these software modules will function, preferably in an integrated manner, on the same device. These software modules can be combined in various permutations, and here all such permutations are contemplated, subject to the general consideration that integrated systems with a larger number of modules are typically preferred.

Figure 2:
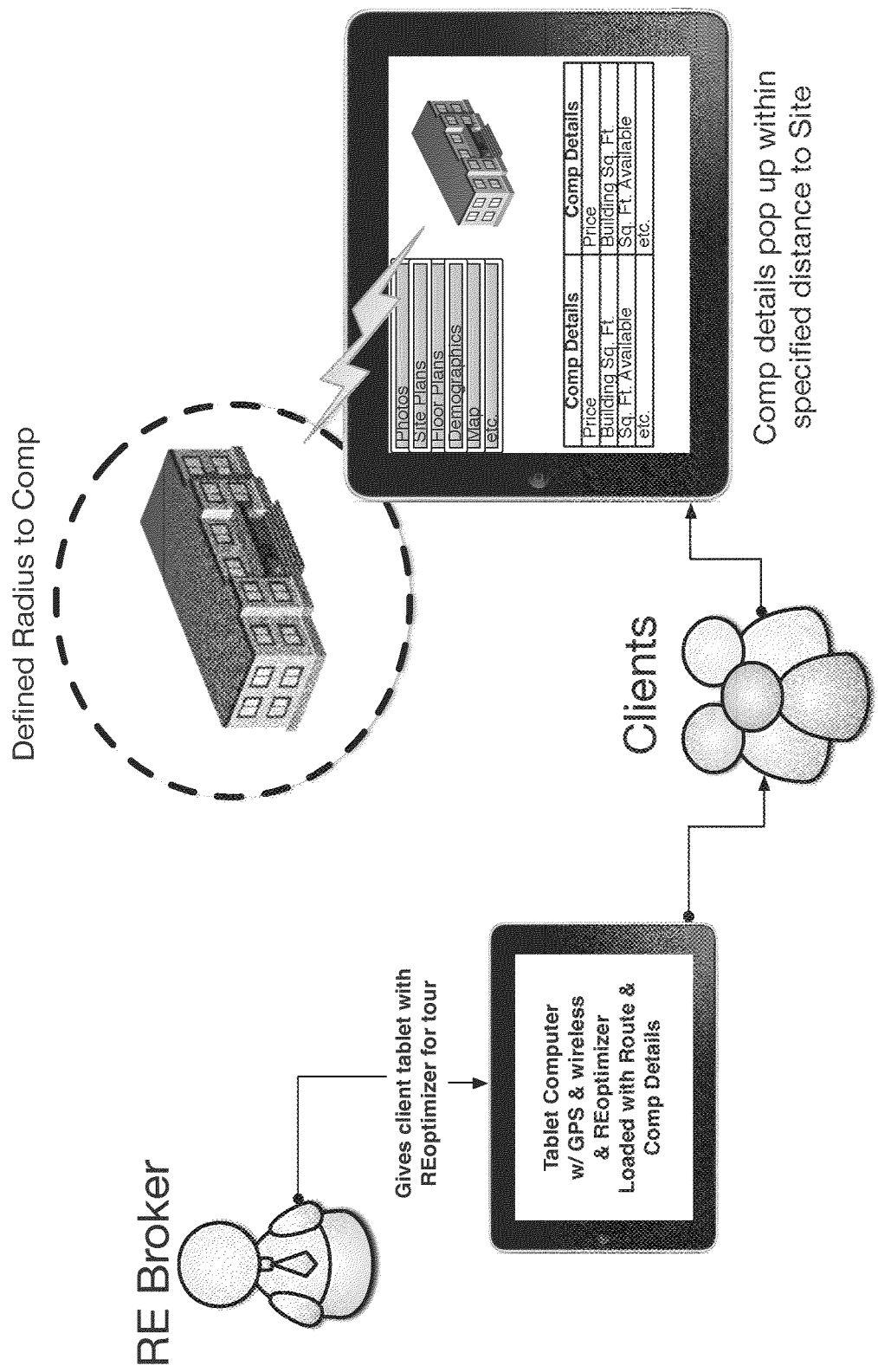
FIG. 2 shows an example of how the system, when implemented on a tablet computer (here an iPad) may function as an automatic broker (autobroker).

FIG. 2 shows one embodiment of the system, here providing an example of how the system, when implemented on a tablet computer such as the iPad, may function as an automatic broker (autobroker). In use, for example, a human broker may provide the tablet computerized device, either pre-loaded with the software that implements the invention's methods, and with appropriate real estate property data also preloaded, to a client, often during a real estate tour. Alternatively the device may be configured to wirelessly download portions of the software and relevant data from remote servers during use as needed. In either event, the device and software can then assist the broker and clients in their subsequent tours, property evaluation, and decision-making.

In the FIG. 2 example, as the clients approach a particular real estate property of interest, the GPS device in the tablet computerized device detects when the clients are within suitable proximity of the property (e.g. 1/10 mile), and the system then uses this GPS proximity data as a cue to then display information pertaining to this particular property. Alternatively of course, the user may request this information directly, and from any location, by entering the appropriate commands to the device's graphical user interface (GUI).

The property information initially presented by the device may contain, for example, one or more photos, as well as other information pertaining to the property itself. In a preferred embodiment, the device will use the KSD information to additionally show how this particular property compares to a reference or ideal property of interest, or to another comp property of interest.

In many embodiments, the device will often give users access to other screens that, for example, allow the user to view or input KSD information pertaining to the property at hand. In other embodiments, the system may additionally use augmented reality methods to allow clients to visualize both the present property, as well as potential improvements to the property, at the same time. These augmented reality concepts will be discussed in more detail shortly.

In another embodiment, a real estate broker, property manager or owner may leave virtual brochures of the Comp that are either pre-stored in the system and displayed when the client is at the location and the geographical location module (GPS, WiFi address, cell tower triangulation, Bluetooth, etc.) triggers the display of such brochure. As yet another alternative, the client can bring up such information by scanning a bar code, such as QR code, which may be affixed to either the property site or to various property owner/manager informational materials. Other devices such as RFID tags, near field communication chips (NFC), and essentially any other wireless, optical, or other location identification method may be used. Either way, the client would then be able to access multi-media information about the Comp that is either pre-stored or downloaded real-time from the Internet (i.e.: a web URL).

Further, the real estate broker, property manager, or owner can also use the above methods to grant access to the property—e.g. with electronic keys, wireless activated locks, and the like. Thus a user can use the invention's software, in conjunction with embedded NFC or RFID or other short range identification functionality, to swipe locked doors and gain access.

In its most basic embodiment, the invention may be a computerized method of conducting real estate tours using a mobile computerized device with at least one processor, memory, a graphical user interface, a GPS receiver, and a wireless transceiver. This basic embodiment of the invention will typically operate by first loading real estate property information pertaining to a reference or ideal real estate property, as well as the position of said at least one real estate property, into the devices' memory. The invention will also usually also require the loading of various types of real estate property information pertaining to at least one comp real estate property, and the positions of said at least one real estate property, into the device's memory. This loading into memory can either be a pre-loading process done before the tour starts, or it can be a dynamic "as needed" loading process using wireless access to remote servers, or some combination of pre-loading and dynamic loading.

Here the idea is that a client evaluation of any given property of interest, e.g. a "comp" can be facilitated if the client can compare this "comp" to either a reference site that the client currently is using (e.g. a previous commercial lease, or a previous private residence), or an idealized site that may or may not exist, but which would embody all favorable criteria that the client could possibly hope to obtain. As previously discussed, in both cases, these various types of information may either be provided by a remote wireless link from, example a server that stores this information, or alternatively may be provided by other means, such as direct wire input (e.g. via a USB cable), by removable memory chip, by direct data entry, or by other means.

In the most basic embodiment of the invention, the mobile computerized device will then display, for at least the reference or ideal real estate property, or at least one comp real estate property, at least some of the real estate property information on the device's graphical user interface.

In various preferred embodiments, however, the method and device may do much more than this, and instead will be integrated with various additional software modules that perform other functions as well.

The method and device may, for example assist the client in evaluating and entering KSD data for various sites. Alternatively or additionally, the method and device can do one or more other functions such as automatically displaying floor plans, displaying augmented reality enhanced versions of the property while the client (or broker) is looking around, and do one or more functions to help the broker or client manage the tour itinerary. Indeed, the method and device can even help perform automated site tours by providing audio narrative commentary, as desired.

Note that although many of the examples in this specification focus on commercial real estate property, often using leased commercial real estate as a specific example, these examples are not intended to be limiting. In general these concepts disclosed herein can be used for any type of real estate management or transaction function, and can be used for commercial real estate, residential real estate, or even unimproved land type real estate.

In some embodiments of the invention, it may be useful to include software modules that help manage the broker or client tour. As previously discussed, for these tours, it is often important to contact other brokers or managers (e.g. landlords, owners, or other property managers) of the property of interest in advance in order to schedule these visits. However plans often change, and here the invention's methods can also help keep all the parties in the loop if the tour plans change.

In this embodiment, tour itinerary information pertaining to the times of visiting and order of visiting of the various properties of interest may be loaded into the device memory, along with the contact information (e.g. telephone numbers, email addresses, and the like) of the brokers or managers (e.g. landlord or other property manager) for these properties. In this mode, the device may additionally often display a tour itinerary of these various properties on the device's graphical user interface (display screen), and allow the user to select, deselect or change the times of visiting and order of visiting of the various properties.

As previously discussed, the invention's automated site tour software modules and methods will generally require that tour itinerary information pertaining to the times of visiting and order of visiting of the various properties first be loaded into the device's memory, either in advance, or through wireless connection to remote servers as needed.

In the automated site tour mode, the system will generally display a tour itinerary of the properties on the device's graphical user interface, and allow the user to select, deselect or change the times of visiting and order of visiting of the various properties. Depending on the selections, the device will often then be configured to display a tour route for either the original or the revised tour itinerary. The device may also be configured to make useful suggestions regarding tour route optimizations, such as proposing time-optimized travel routes. In some embodiments, the device may even be programmed to suggest potential changes in the itinerary to reduce travel time, or otherwise optimize the tour.

Just as a human real estate agent will often inform clients about the area and the real estate property while driving to a particular property site of interest, so too in some embodiments, the invention may also provide software modules that also provide audio or text based narration. To implement this functionality, typically the broker will load audio or text descriptions describing the characteristics of the real estate itself or regions surrounding the real estate locations into the device (again either in advance, or as needed by wireless connection to remote servers). The device software can then be optionally programmed to use the location information provided by the device's GPS receiver device to select when these audio or text descriptions should be output on the device's speaker (or other audio output device) and/or in the device's graphical user interface. This way, for example, if the broker has a schedule conflict, the broker can for example pre-record the narrative, give the device to the client or a broker's assistant, and the device can in turn produce the desired narration while the client is traveling.

Figure 3:
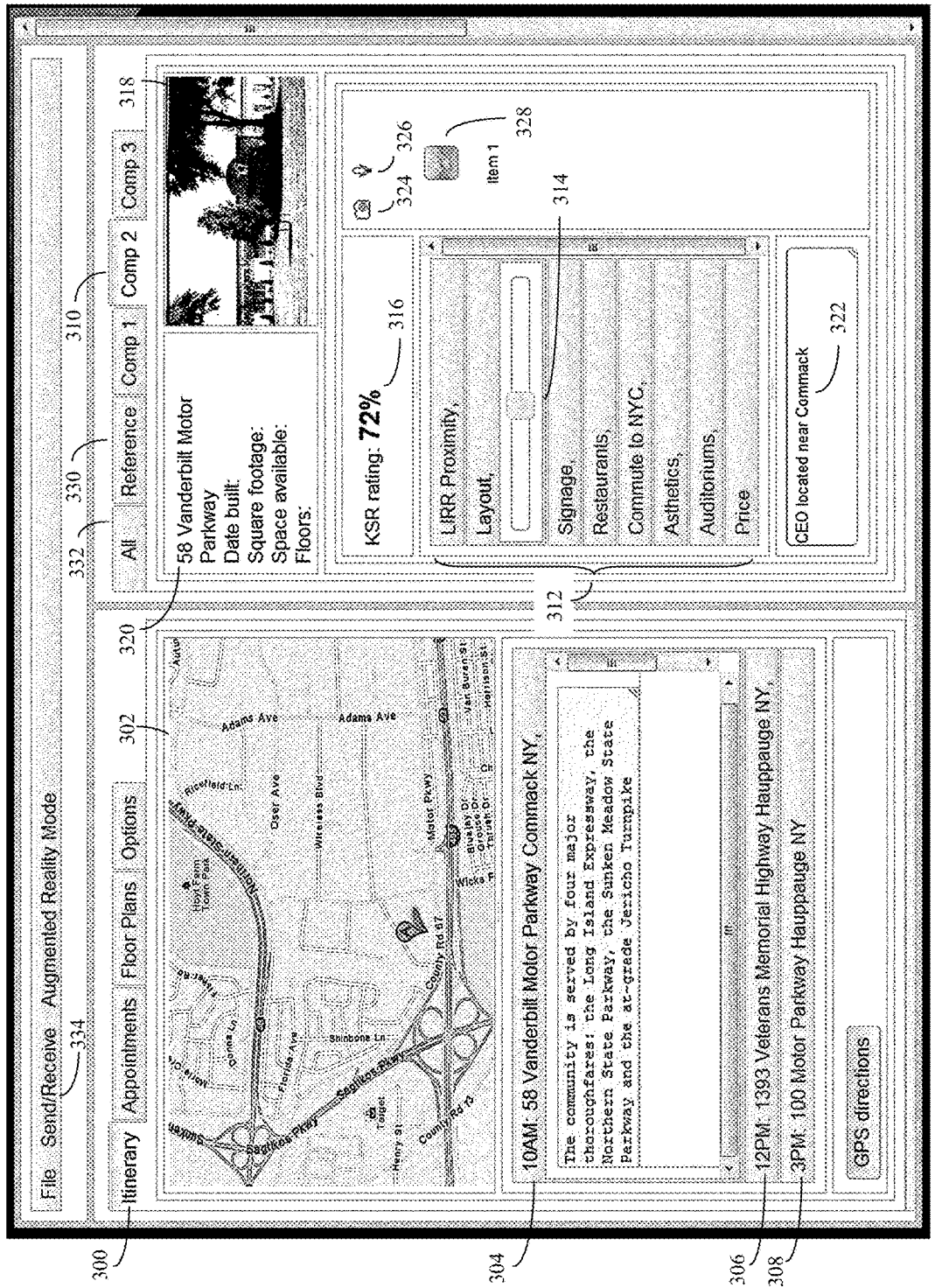
FIG. 3 shows a screenshot from an interface mock-up of the invention, here showing how the invention's itinerary module can help organize the real estate tour schedule by time, give the client some background information on a first property, while also allowing the client to simultaneously review the first property on the tour in the context of other properties.

FIG. 3 shows a screenshot from screen-mockup of the invention, implemented in an open source HTML5 based design software system (Maqetta). This screenshot shows how the invention's itinerary module can help organize the real estate tour schedule by time, give the client some background information on a first property, while also allowing the client to simultaneously review the first property on the tour in the context of other properties.

This itinerary module (300) may, for example, show a map of the site or sites to be visited (302), and at least the day's schedule (304)-(308). Here for example, to conserve limited screen space on a touch-sensitive tablet such as the iPad, the system may show the itinerary in the form of an accordion module that opens up and exposes further detail upon user touch, and then closes upon a second user touch thus conserving valuable screen space. Here the user has touched on the first scheduled stop of the day (304), a 10:00 AM stop at 58 Vanderbilt Motor Parkway, Commack N.Y. Here the itinerary can provide additional commentary on this site.

Note further that the KSD evaluation properties of this invention may implement the teachings of Ser. No. 13/103, 485 either in full, in part, or as a superset (i.e. extending the teaching to residential real estate, etc.) as desired.

Here during any part of the tour process as desired, the user can also evaluate this site (here shown as Comp 2) (310) and as desired adjust the various KSD ratings (312) using software parameter adjusting sliders or other mechanisms (314). Here the user is adjusting the "layout" KSD rating for this particular site. The overall KSR rating of the site (i.e. the value of the Key Site Rating function composed of the various individual KSD variables) is shown as (316). Here, information about this particular "comp" site, as previously discussed in parent application Ser. No. 13/103,485, incorporated herein by reference (see for example FIG. 14A) can also incorporate other information such as photos of the site (318), building information (320), and other information such as the user's notes (322). Additionally, the system may also allow the user to use the devices camera to take site photos (e.g. by pressing icon 324) or take audio notes (e.g. by pressing icon 326) and store these in site related image, video, or audio files (328) for later playback. In FIG. 3, the user has stored one such file (328), perhaps from a previous visit to this site.

Returning to the KSD evaluation aspects of the invention—as previously discussed, it is useful to consider the various KSD functions and data types disclosed herein as being a superset of the KSD functions and data types previously discussed in parent application Ser. No. 13/103, 485, incorporated herein by reference. Indeed, these KSD functions may also be extended to a greater variety of real estate types (e.g. residential property as well as commercial property) and transaction types (e.g. management and sales as well as leasing).

Although not required for all embodiments of the invention, in a various preferred embodiments, the other methods or software modules (e.g. itinerary functionality, appointment functionality, floor plan functionality, augmented reality functionality, etc.) will often be supplemented by a KSD evaluation module.

In the KSD evaluation module, generally at least one reference or ideal property (330) and at least one comp real estate property (e.g. 310) will be assigned, on an individual basis, a plurality of Key Site Driver (KSD) numeric descriptors (312) describing the various characteristics of the property (criteria). As discussed in more detail in parent application Ser. No. 13/103,485 these various sites can be presented in a dashboard format or overview that displays comparative information from all sites at once (e.g. Ser. No. 13/103,485 FIG. 14D 1406, 1408, 1410, 1412). This type of overview information can be presented in the "all" tab (332).

Thus in the KSD evaluation module, the mobile computerized device will allow the user to define a plurality of different KSD variables for one or more reference or ideal properties. Here, for example, the system will allow the broker or client to define the relative importance coefficients for multiple individual KSD variables. The system will also allow the broker or client to define or create a KSD function that produces a property specific KSD number (or KSR number using the alternative nomenclature) that can be used to describe both the reference or ideal property, and the various comparison (comp) real estate properties. Here, although other possibilities can be done, it is useful to set this function so that generally the sum of all of the relative importance coefficients in these multiple KSD variables is equal to 100% or 1.

Financial considerations are often a very important KSD variable. In some embodiments, the basic method and system will allow a particular property of interest, such as an existing lease, existing owned property, or other reference property of interest (here simply termed an "existing lease for brevity to be evaluated, relative to at least one set of comparable potential other properties or leases (Comp[s]). Here, for example, a portfolio containing at least one existing lease on a leased property (each with its particular location, lease or ownership start date, optional lease expiration date, rent or mortgage payments as function of time, and projected other property expenses as a function of time, each having its own associated set of comps) can be evaluated. Here for example, this evaluation can be done by projecting future expenses (on an individual property basis) this at least reference property by performing a numeric integration over time from (again as an example) the present time to the reference property lease expiration date. The equation to be integrated can be the sum of the reference property rent (as a function of time) and projected other leased property expenses (as a function of time). This integration will generally produce the projected total cost of the reference property.

This process can be done for each individual comp property as well. Here again, the data can be obtained describing the same type of details for the comp, and the projected total costs of each comp can be further performed by doing the same type of numeric integration.

In addition to the financial data, the reference property and "hits" comps will also have a variety of other KSD parameters. Here, these various KSD parameters, which may for example be referenced to an ideal property (which may or may not exist). Here the relative importance coefficients of both the financial projection KSD parameters and the other KSD parameters can be determined or defined in a manner that creates a KSD function that in turn produces a KSD number (KSR value) that describes the various properties. As previously discussed, generally all of these relative importance coefficients should sum up to a value of 100% or 1. This KSD function can then be used to rank all of the various properties on a per-property basis. This KSD function, when applied to the various property KSD numbers, will thus produce an overall suitability ranking or comparison (KSR number), which can then be displayed (e.g. FIG. 3, 316), along with other data as desired, on the computerized device.

In a commercial context, examples of other types of KSD variables include aesthetics, floor layout, signage, gyms, auditoriums, proximity to daycare, proximity to airports, rail depots, or interstate highways, proximity to restaurants, commuting time to key locations, and ease of expansion. In a residential context, other factors such as proximity to schools and parks, neighborhood crime statistics, neighborhood socioeconomic scale and the like may also be used.

Thus the system will generally also allow the broker or client to assign values to at least some of these various KSD variables, and use the KSD function to create at least one KSD number (KSR value) that describes the reference or ideal property of interest or comp real estate property of interest. Often, it will be useful to further transmit these KSD variables to a recipient (often the broker's server or computer) using the device's wireless transceiver. In FIG. 3, this option is shown as menu option (334). Indeed, all of the data in the invention may be transmitted or received as desired.

For KSD evaluation purposes, all else being equal, it is often preferable to physically visit the real estate site, as this can lead to more accurate KSD information. Further, by being physically at the site, either the broker or client may notice additional factors of interest that were not previously used as KSD criteria, but perhaps should be. For example, if a property has some previously undocumented desirable or undesirable feature, such things can be noted and used to further improve the utility of the KSD comparison method.

Figure 4:
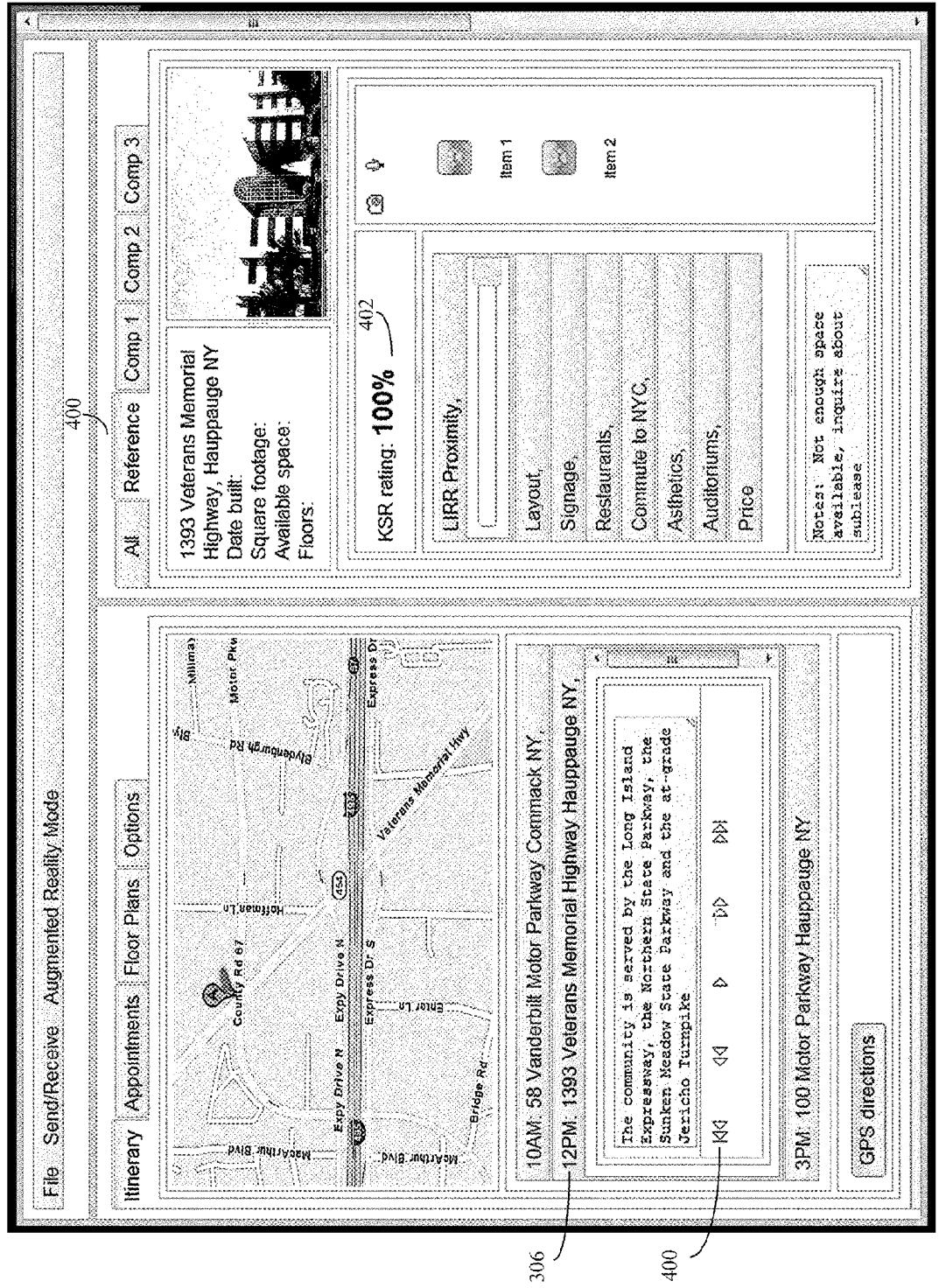
FIG. 4 shows another screenshot, again showing the invention's itinerary module in operation. Here the client is reviewing details of the second property on this days tour, and additionally may be playing back audio broker commentary regarding this second property. The client can also review and even rate this second property during this time (or other properties) as desired.

FIG. 4 shows another screenshot, again showing the invention's itinerary module in operation. Here the client is reviewing details of the second property on this days tour (306), and additionally may be playing back audio broker commentary regarding this second property (400). The client can also review and even rate this second property during this time (or other properties) as desired. In this example, this second property (the 12:00 pm appointment at 1393 Veterans Memorial Highway) is so desirable that it is being used as the "idea" or "reference" property for KSD evaluation purposes. Note that this property has a perfect (100%) KSR (overall KSD numeric function) rating (402).

If the user desires to make itinerary changes, the device can be programmed to then automatically transmit a message to the impacted broker(s) or manager(s) informing them about the changes. Thus, for example, if the tour is running an hour late for a visit for a particular party, a simple touch on the device GUI direct the device to inform the properties' broker or manager of the delay, thus improving tour efficiency and interpersonal goodwill. This notification can be, for example, by SMS message, email message, or even automatic schedule change on the broker's or manager's automated appointment calendar.

In one embodiment, as the actual tour progresses, the system can additionally log the visits by the real estate broker and/or the end-user client to the various sites or comps. Although optional, this automatic visit logging feature would be highly useful to the managers and owners of properties, because it would let them know the activity level of showings, who may be interested in their sites and if their property broker was in attendance.

Additionally, since brokers are often financially supported by commissions from the real estate transactions that they have facilitated, such a feature would be useful because it would help brokers prove that they introduced a particular client to a particular real estate location.

The system may thus, for example send this visit information automatically to the property manager and owner, while further sending a copy back to the broker's computer who is doing the tour. Additionally, the client themselves may also have a report automatically emailed back to them of what comps they visited, plus their own now refined KSD scores of each, plus notes in the form of text, audio, photos and video.

Figure 5:
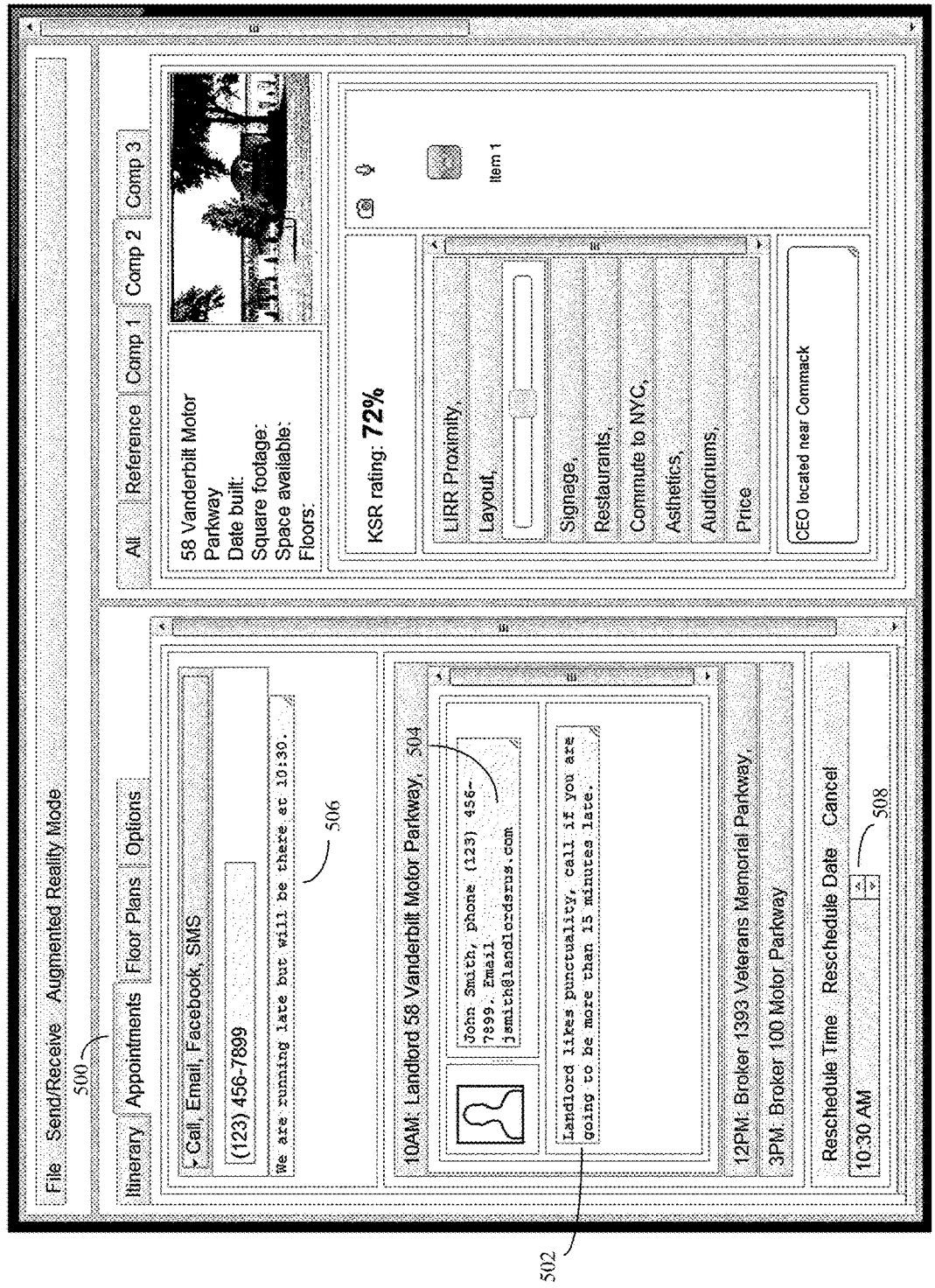
FIG. 5 shows a screenshot showing the invention's appointments module in operation. In this example, the user (client or broker) is running late for the first appointment. The appointments module can notify the client that the landlord for this first property likes punctual visitors, and also gives the landlords contact information via various communications channels. Here the user is using the invention to send an SMS message to this landlord informing him of the schedule delay. The client may additionally reschedule the time electronically.

FIG. 5 shows a screenshot showing the invention's appointments module in operation. This is shown by tab (500). In this example, the user (client or broker) is running late for the first appointment. The appointments module can notify the client that the landlord for this first property likes punctual visitors (502), and also gives the landlords contact information via various communications channels (504). Here the user is using the invention to send an SMS message to this landlord informing him of the schedule delay (506). The client may additionally reschedule the time electronically (508).

Floorview (Floor Plan) Modules:

As previously discussed, both commercial and residential real estate often consist of buildings with multiple floors or levels. In order to improve broker and client convenience during tours of such sites, in some embodiments, the device software will direct the device to automatically bring up floor plans for the correct floor when the device user reaches this correct floor. This helps the device provide the correct data to the client (or broker) at the instant that it becomes most relevant. Alternatively the user's may also bring up the relevant data by manually requesting the data.

There are various ways to implement this automatic data presentation functionality. Essentially this embodiment of the invention's methods may trigger presentation of floor plans or other data when the device detects that the user has changed altitude, while at the building site location. Altitude changes may be detected by multiple methods and by multiple sensors. One simple way to detect altitude changes is to simply use the device's GPS sensor to detect changes in altitude. Alternatively the device may integrate movement from the device's accelerometers and motion sensors, and compute altitude changes that way. As yet another alternative, the device may triangulate its position relative to various local wireless transmitters, such as various cellular, WiFi, or Bluetooth™ transmitters, and compute altitude changes by this manner. For example, the device could determine the user's location within a building structure by using a WiFi-location table or database that lists the building's (or other local) site unique WiFi base station names, and optionally also their relative signal strength. Here, a building owner could either identify the location of the various WiFi base stations by explicit WiFi location names (e.g. 445th floor—100 Main St. WiFi"), or by a less explicit WiFi name, and then make the name-location information available to the WiFi-location table database.

As yet another alternative, the computerized device may incorporate sound recognition technology, and identify locations by explicit speech interpretation or by monitoring the acoustic properties of the environment. Indeed, the device may even use an air pressure type altimeter for detecting altitude changes.

Recently announced real-time navigation chips, exemplified by the Broadcom 4752 Integrated Multi-Constellation GNSS Receiver chip, which utilizes signals from GPS satellites, cell-phone towers, Wi-Fi hot spots, gyroscopes, accelerometers, step counters and altimeters may be useful in this regard.

Regardless of the method used to detect change in altitude, once the mobile device detects the altitude change, its software can then retrieve the real estate property information pertaining to the floor plan for a the story or level that the device is now on, and display this floor plan on the device's display screen (GUI). Alternatively users may also choose to manually select this information by appropriate GUI selections as well. This allows them to view the floor plan in advance, but then have the floor plan also instantly re-presented when it is most important. Typically the software will be configured so that this automatic floor plan feature can be turned on and off according to user preference.

Alternatively, the user may select display of the particular floor plan of interest manually, here for example by pressing the appropriate floor level tab.

Figure 6:
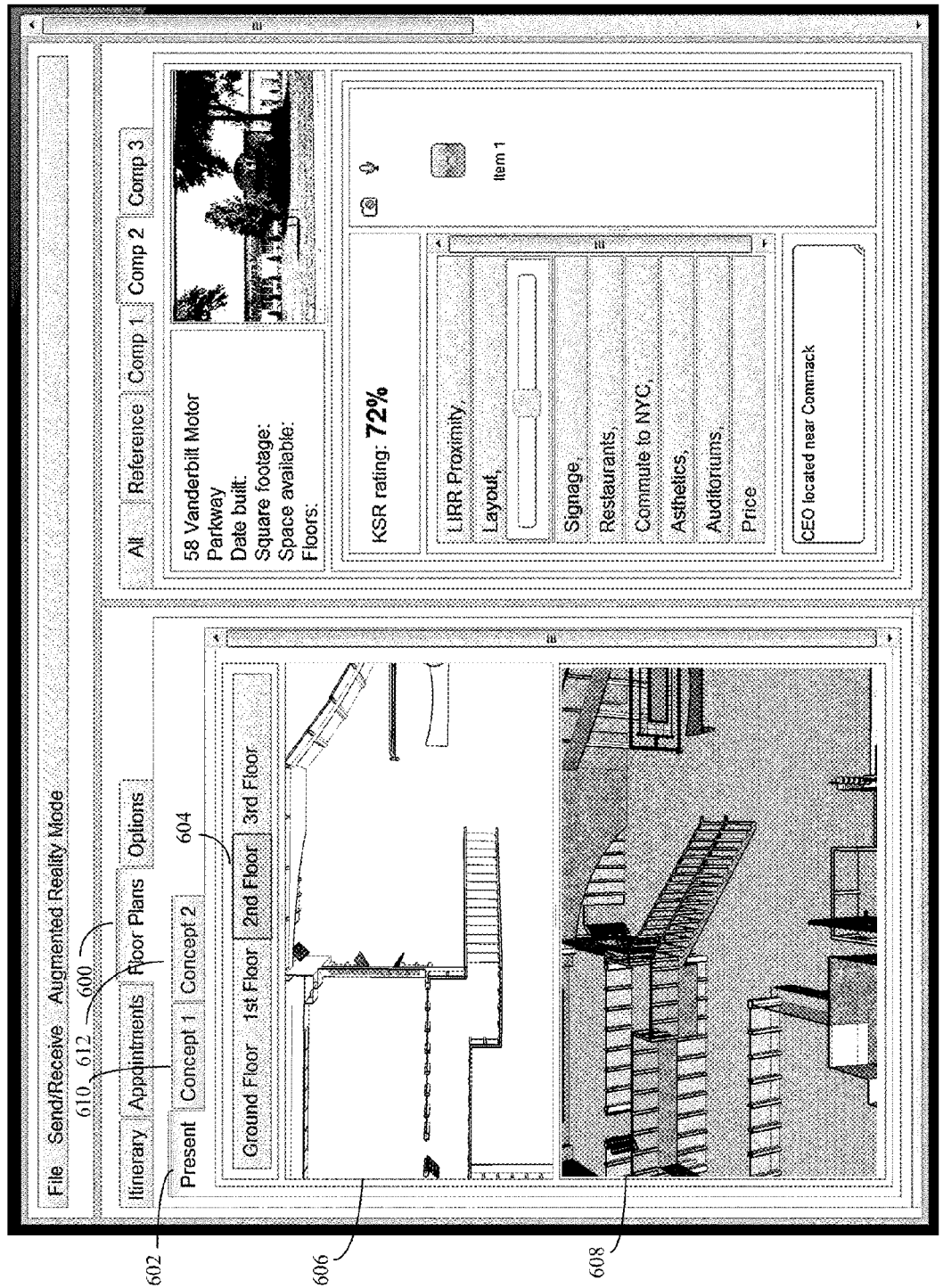
FIG. 6 shows the invention's floor plan module in operation. Here the present floor plan for the second floor of the first site visited is being displayed. The system also enables the user to see some alternate concept diagrams of how this floor plan can be modified to fit the client's needs.

FIG. 6 tab (600) shows the invention's floor plan module in operation. Here the present floor plan (602) for the second floor (604) of the first site visited is being displayed (606), (608). The system also enables the user to see some alternate concept diagrams of how this floor plan could be modified to fit the client's needs (610), (612). To facilitate viewing of detailed floor plans, in some embodiments, this module may be configured to zoom (expand) in size to fill more or even the entire display screen as desired.

Augmented Reality Functionality

In some embodiments, it may be useful to further enhance the system with various augmented reality or virtual reality software modules. Such modules could either display an overlaid image of what the user sees through the "camera view" of the Tablet computer or Smart Phone device, so that the underlying image is still there, but overlaid with new information, or it could completely replace what is displayed on the mobile device's screen with such new information.

In one embodiment, images or CAD drawing information pertaining to possible future configurations (i.e. remodeling changes) of this reference or ideal or comp real estate property can be loaded into the device. For example, if a client wishes to partition the building floor plan differently, the owner or broker of a property of interest may commission an architect or CAD designer to produce at least informal CAD drawings showing these proposed modifications. The mobile computerized device can be programmed to take these drawings and information, and use its GPS sensors, location and orientation sensors, or video camera obtained position data to determine the device's current position and orientation. The device can then position and orientation adjust these images or CAD drawings, and then display them on the device user interface. Thus for example if the user is holding the device in a particular position, orientation, and angle, the system can also compute what the modification would look like from that particular position, orientation, and angle, and let the user see what the future configuration of the property would then look like from that viewpoint. The user can then directly compare these proposed modifications with the user's present real-world view of the property.

Indeed in some embodiments, when the computerized device has a video camera, this video camera can be configured to obtain video of at least a portion of the device's surroundings. The system can then be configured to provide video images of the present appearance of said reference or ideal or "comp" real estate property from this viewpoint. Then, optionally with position and orientation data further refined by the video data, the device can simultaneously show both the location and orientation adjusted images or CAD drawings of the possible future property improvements (configuration), and as images video images of the present appearance of the property, on the same display screen (GUI) and at the same time.

In some embodiments, it may be useful to show these simultaneous location and orientation adjusted images or CAD drawings pertaining as overlays with the device's video images of the present appearance of the property. This can be, for example as a semi-transparent overlay.

Figure 7:
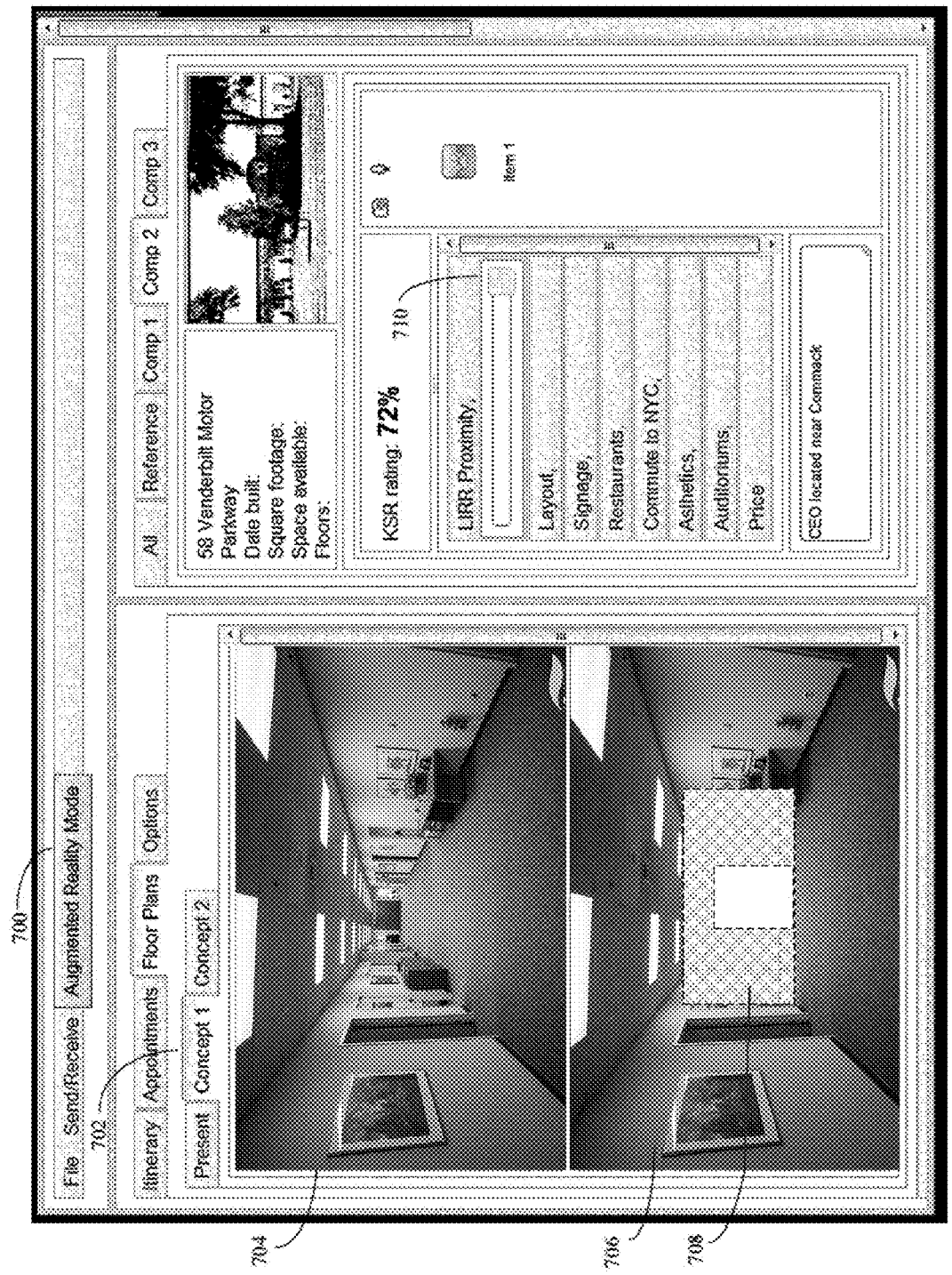
FIG. 7 shows the invention's floor plan module in augmented reality mode. Here a user can inform the system to use the device's camera to photograph the current surroundings, and supplement this photograph with proposed floor plan alteration data, thus allowing the user to better visualized proposed floor plan changes.

FIG. 7 shows the invention's floor plan module in augmented reality mode. Here a user can inform the system to use the device's camera to photograph the current surroundings, and supplement this photograph with proposed floor plan alteration data, thus allowing the user to better visualized proposed floor plan changes. In this example, augmented reality mode is being invoked using an augmented reality mode menu setting (700), and is being used to show a first concept of modifying this building interior (702)

In FIG. 7, the system is showing a presently photographed or video image of an outdated building interior (704), here augmented with a proposed alteration to this outdated interior (706) and the specific modification (here a new wall with a doorway) (708).

Note that while these various floor plan review processes are continuing, the user can continually adjust the various KSD values (710), changing them from their earlier settings (compare the FIG. 7 slider setting to the same slider setting on FIG. 6) as the user forms new opinions about the site.

Figure 8:
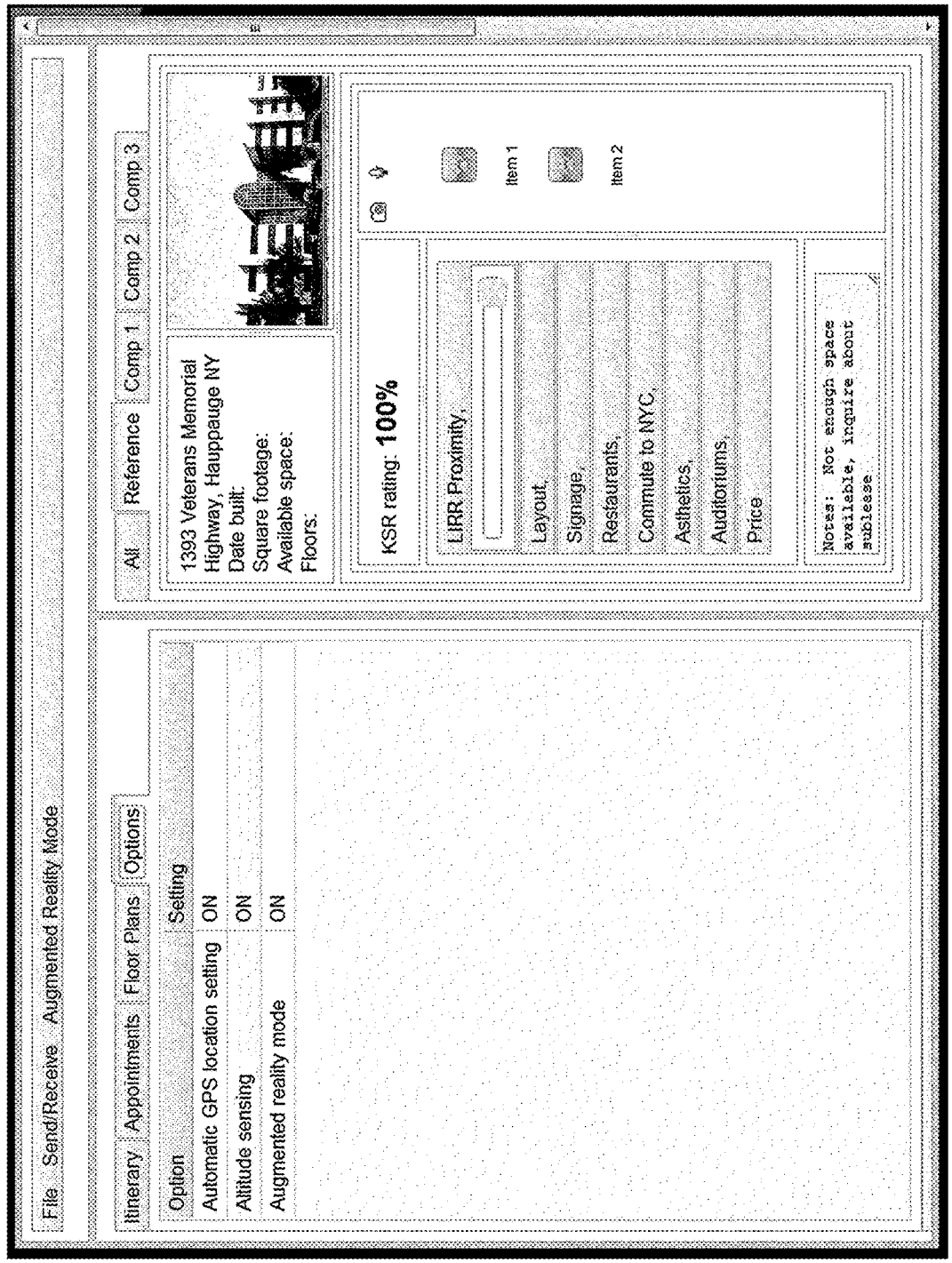
FIG. 8 shows some of the invention's various parameter settings.

FIG. 8 shows an example of some of the invention's various parameter settings. In this example, the user has told the system to automatically bring up the various site information using GPS information as the user approaches the site, and bring up the appropriate floor plans using altitude information. The user has also told the system that the use will want to invoke augmented reality mode, which can cause the system to reserve computational capability and files as needed as augmented reality methods can be computationally intensive.

Figure 9:
FIG. 9 shows the invention, operating in the form of tablet computer software, being used by clients during a building walkthrough.

FIG. 9 shows the invention, operating in the form of tablet computer software, being used by clients during a building walkthrough. Here the invention is showing a floor plan, the user's current location, and various real estate and financial information pertaining to this particular building.

Figure 10:
FIG. 10 shows the invention, here operating in the form of smartphone or handheld tablet software, being used in conjunction with wireless technology or optical recognition technology to open an electronically locked door.
Figure 11:
FIG. 11 illustrates how the invention's software can allow the client to tour the building, while the broker, or property owner/manager can conduct remote virtual tours. Alternatively or additionally, the client, using the invention, can video tour the building (Comp) remotely, with or without the broker providing them with a real-time tour of the facility. Here the broker can walk the space and use the invention to provide the remote client with real-time video tours.

FIG. 10 shows the invention, here operating in the form of smartphone or handheld tablet software, being used in conjunction with wireless technology or optical recognition technology to open an electronically locked door. In other embodiments, these methods may also be used to log in when the building was toured by a broker or client, or other purposes.

Additionally, these local identification methods can be used to, for example, trigger electronic chat sessions with the broker or property management. Thus for example, when the device senses that it is in a location previously designated by the broker or property owner/manager as being interesting, the system can either bring up video or sound of the broker, or alert the broker (e.g. via SMS message, email, telephone, etc.) or manager/owner that a potential customer is in the region of interest, and even optionally establish a communications session between the customer and broker or owner/manager as desired. This essentially can create "virtual broker" type functionality.

Further Mobile Computerized Device Discussion

Although the methods described herein can work with more limited capability mobile computerized devices, in a preferred embodiment, higher capability mobile computerized devices, exemplified by the popular Apple iPad 3 and iPhone 4, with high-resolution screens, memory in excess of 1 Gigabyte (often 8, 16, 32, 64 or more Gigabytes), may be used.

Because such higher capacity computerized devices have relatively large amounts of internal memory, all the necessary data, photos, floor plans, audio, video, 3D CAD drawings, and the like can easily be stored onboard the device prior to any tour, and thus the need for making instant and reliable wireless connections with the Internet immediately after entering into a new building for the first time can be reduced. Similarly, data obtained during the tour—e.g. entered KSD parameters, audio notes, image or video data and/or notes, and the like may be stored onboard the computerized device, and then only uploaded to another user or server when it is convenient. Thus although the present methods may utilize wireless connections to, for example, remote Internet servers for the purpose of data interchange when it is convenient, such wireless connections are optional, and may be dispensed with when it is not convenient.

Put alternatively, the system will be able to take full advantage of any mobile wireless connections as they continue to develop, but as stated above, is not dependent on them.

Additionally, the methods herein may also make use of the various concepts further disclosed in provisional application 61/794,372 entitled "Reoptimizer Walkthrough", inventor Donald Charles Catalano, filed Mar. 15, 2013; the contents of which are incorporated herein by reference.

The invention claimed is:

1. A computerized method comprising:
conducting real estate real-world tours using a handheld mobile computerized device comprising at least one processor, memory, a graphical user interface, and at least one wireless transceiver, and at least one location determining device, by:
using said at least one processor to load computer readable reference real estate property information pertaining to a real estate-customer's reference real estate property and positions of said reference real estate property into said memory in a manner that said handheld mobile computerized device retains said reference real estate property information on at least one of a stand-alone basis and as part of a wireless networked system with external servers;
using said at least one processor to load computer readable comp real estate property information pertaining to a plurality of comp real estate property and positions of said plurality of comp real estate property into memory in a manner that allows said handheld mobile computerized device to retain said comp real estate property information on at least one of a stand-alone basis and as part of a wireless networked system with external servers;
for tour real estate property comprising at least one of said reference real estate property and said a plurality of comp real estate property, using said processor and said at least one location determining device to display at least some information pertaining to said tour real estate property on said user interface according to a location of said handheld mobile computerized device during said real estate real-world tour;
further using said user interface to define real estate customer user customized comparable data comprising property specific values comprising at least one of numbers and images that describe said tour real estate properties, thereby allowing said real estate customers to evaluate multiple tour real estate properties and better understand how each said tour real estate property would meet the needs of said real estate customer;
wherein said handheld mobile computerized device additionally comprises position determining devices comprising at least a GPS receiver, an orientation sensor, and an accelerometer;
further loading images comprising information pertaining to at least one of property information and at least one possible future remodeling change of said tour real estate property into said memory;
using said position determining devices to automatically, using said at least one processor, determine a location and orientation of said handheld mobile computerized device;
and, during a real-world tour of said property, displaying location and orientation adjusted images pertaining to said at least one of property information and at least one possible future remodeling change of said tour real estate property on said user interface.

2. The method of claim 1, wherein said at least one reference property and said plurality of comp real estate property have, on an individual basis, a plurality of Key Site Driver (KSD) numeric descriptors describing their characteristics;
said method further comprising entering a plurality of different KSD variables for ideal version(s) of said at least one reference property into the user interface of said handheld mobile computerized device, and further using said user interface to define relative importance coefficients for each individual KSD variable in said plurality of KSD variables, thus creating and using said at least one processor to enter into said memory a KSD function that produces a property specific KSD number that describes said reference and comp real estate properties;

at least some of said KSD variables being subjectively determined and subjectively given relative importance coefficients by said real estate customer;

further using said at least one processor to ensure that a sum of all of the relative importance coefficients in said plurality of KSD's variables is equal to 100%;

further using said user interface and said at least one processor to, for at least one tour real estate property, assign values to at least some of said KSD variables and store these values into memory, and using said processor and said KSD function to create at least one KSD number that describes a tour real estate property.

3. The method of claim 1, wherein said handheld mobile computerized device additionally comprises at least one video camera;

said at least one video camera is configured to obtain video of at least a portion of a surroundings of said handheld mobile computerized device, thereby producing video images of a present appearance of said tour real estate property;

during a real-world tour of said property, further using said video camera, said images comprising information pertaining to at least one of property information and at least one possible future remodeling change of said tour real estate property, and said at least one processor to simultaneously show both location and orientation adjusted images pertaining to at least one of said at least one of property information and at least one possible future remodeling change of said tour real estate property; and also using said at least one processor to display said video images of a present appearance of said tour real estate property on said user interface.

4. The method of claim 3, wherein simultaneous showing of both location and orientation adjusted images pertaining to said at least one of property information and at least one possible future remodeling change of said tour real estate property, and said video images of a present appearance of said tour real estate property, are displayed on said user interface, using said at least one processor, as at least one of non-transparent and semi-transparent overlays of said at least one of property information and at least one possible future remodeling change overlaid on said video images of a present appearance of said tour real estate property.

5. The method of claim 1, further loading tour itinerary information pertaining to the times of visiting and order of visiting of a plurality of said tour real estate properties into said memory in a manner that allows said handheld mobile computerized device to retain said tour itinerary information on at least one of a stand-alone basis and as part of a wireless networked system with external servers;

loading real estate service manager telecommunications contact information comprising telecommunications contact information for any real estate service manager responsible for at least one tour real estate property of said plurality of said tour real estate properties into said memory in a manner that allows said handheld mobile computerized device to retain said real estate service manager telecommunications contact information on a stand-alone basis and as part of a wireless networked system with external servers;

during a real-world tour of said property, using said at least one processor to automatically display a tour itinerary of at least one real estate property on said user interface, and enabling the user of said handheld mobile computerized device to use said user interface to select, deselect or change the times of visiting and order of visiting of said at least one tour real estate property;

wherein if the user of said handheld mobile computerized device desires to select, deselect, or change the times of visiting of said at least one tour real estate property of said plurality of said tour real estate properties, using said handheld mobile computerized device, and said at least one processor, to use said wireless transceiver to automatically transmit a message to said real estate service manager informing them of an altered time of visiting said at least one tour real estate property.

6. The method of claim 5 wherein said real estate service manager comprises any of a broker, owner, lessor, sublessor, property manager, and other real estate service providers.

7. The method of claim 5, wherein said messages transmit to an automated appointment calendar of said real estate service manager.

8. The method of claim 1, further loading tour itinerary information pertaining to the times of visiting and order of visiting of a plurality of real estate properties into said memory in a manner that allows said handheld mobile computerized device to retain said tour itinerary information on a stand-alone basis and as part of a wireless networked system with external servers;

during a real-world tour of said property, using said at least one processor to automatically display a tour itinerary of said plurality of real estate properties on said user interface, and enabling the user of said handheld mobile computerized device to use said user interface to alter the times of visiting and order of visiting of at least one real estate property.

9. The method of claim 8, wherein during said tour itinerary, when the user of said method desires to revise said tour itinerary by using said user interface to alter the order of visiting of said at least one real estate property, said handheld mobile computerized device's said at least one processor then displays a tour route for a revised tour itinerary on said user interface during a real-world tour of said property.

10. The method of claim 1, wherein said handheld mobile computerized device additionally comprises an audio-video output device, and a GPS receiver device;

further loading previously obtained descriptions describing, for at least some of said real estate properties, characteristics of regions surrounding said real estate property and characteristics of said real estate property into said memory in a manner that allows said handheld mobile computerized device to retain said descriptions on at least one of a stand-alone basis and as part of a wireless networked system with external servers; and during a real-world tour of said property, using location information provided by said GPS receiver device, and said at least one processor, to automatically select when said descriptions should be output on at least one of said audio-video output device.

11. The method of claim 1, wherein said handheld mobile computerized device additionally comprises a GPS receiver;

wherein displaying at least some previously obtained information for at least one of said plurality of comp real estate property, on said user interface is triggered by a location of said handheld mobile computerized device that is relative to at least one of said plurality of comp real estate property, during a real-world tour of said property, as determined by at least one of said GPS receiver and said at least one wireless transceiver.

12. The method of claim 1, wherein said reference real estate property comprises commercial real estate.

13. The method of claim 1, wherein said position determining devices, in addition to said GPS receiver, said orientation sensor and said accelerometer, further comprise at least one additional position determination sensing device selected from the group consisting of additional air pressure based altitude sensors, RFID tag sensors, NFC tag sensors, WiFi address based position sensors, cell-phone tower triangulation based position sensors, other wireless transmitter triangulation sensors, sound sensors, QR code sensors, bar code based sensors, BlueTooth transceiver based position sensors, gyroscope based sensors, and step counter based sensors.

14. The method of claim 1, wherein said reference real estate property comprises any of an ideal or reference property.

15. The method of claim 1, wherein said property information comprises any of photos, videos, written descriptions, floor plans, contact information, and other property statistics.

16. A computerized method comprising:
conducting real estate real-world tours using a handheld mobile computerized device comprising at least one processor, memory, a graphical user interface, at least one wireless transceiver, and position determining devices comprising at least a GPS receiver, an orientation sensor and an accelerometer, by:
using said at least one processor to load computer readable reference real estate property information pertaining to a real estate-customer's reference real estate property and positions of said reference real estate property into said memory in a manner that said handheld mobile computerized device retains said reference real estate property information on a stand-alone basis and as part of a wireless networked system with external servers;
using said at least one processor to load computer readable comp real estate property information pertaining to a plurality of comp real estate property and positions of said plurality of comp real estate property into memory in a manner that allows said handheld mobile computerized device to retain said comp real estate property information on any of a stand-alone basis and as part of a wireless networked system with external servers;
for tour real estate property comprising at least one of said reference real estate property and comp real estate property, using said processor to display at least some information pertaining to said tour real estate property on said user interface;
further using said user interface to define real estate customer user customized comparable data comprising property specific values comprising at least one of numbers and images that describe said tour real estate properties, thereby allowing said real estate customers to evaluate multiple tour real estate properties and better understand how each said tour real estate property would meet the needs of said real estate customer;
wherein, when the position of said handheld mobile computerized device is at the position of said tour real estate property, and said tour real estate property is a multi-story property, using said position determining device and said at least one processor to automatically determine an altitude and story level in said multi-story property of said handheld mobile computerized device;
using said story level in said multi-story property of said handheld mobile computerized device and said at least one processor to retrieve real estate property information pertaining to at least one of floor plans and property information for any of a plurality of stories of said multi-story property of said tour real estate property that encompasses said altitude; and
displaying said at least one of floor plans and property information for said any of said plurality of stories of said multi-story property on said user interface during said real estate real-world tour.

17. The method of claim 16, wherein said position determining devices further comprise at least one additional position determination sensing device selected from the group consisting of additional air pressure based altitude sensors, RFID tag sensors, NFC tag sensors, WiFi address based position sensors, cell-phone tower triangulation based position sensors, other wireless transmitter triangulation sensors, sound sensors, QR code sensors, bar code based sensors, BlueTooth transceiver based position sensors, gyroscope based sensors, and step counter based sensors.

18. The method of claim 16, wherein said at least one reference property and said plurality of comp real estate property have, on an individual basis, a plurality of Key Site Driver (KSD) numeric descriptors describing their characteristics;
said method further comprising entering a plurality of different KSD variables for ideal version(s) of said at least one reference property into the user interface of said handheld mobile computerized device, and further using said user interface to define relative importance coefficients for each individual KSD variable in said plurality of KSD variables, thus creating and using said at least one processor to enter into said memory a KSD function that produces a property specific KSD number that describes said reference and comp real estate properties;
at least some of said KSD variables being subjectively determined and subjectively given relative importance coefficients by said real estate customer;
further using said at least one processor to ensure that a sum of all of the relative importance coefficients in said plurality of KSD's variables is equal to 100%;
further using said user interface and said at least one processor to, for at least one tour real estate property, assign values to at least some of said KSD variables and store these values into memory, and using said processor and said KSD function to create at least one KSD number that describes a tour real estate property.

19. The method of claim 16, further loading images comprising information pertaining to at least one possible future remodeling change of said tour real estate property into said memory;
using said position determining device to automatically, using said at least one processor, determine a location and orientation of said handheld mobile computerized device;
and during a real-world tour of said property, displaying location and orientation adjusted images pertaining to said at least one possible future remodeling change of said tour real estate property on said user interface.

20. The method of claim 19, wherein said handheld mobile computerized device additionally comprises at least one video camera;

said at least one video camera is configured to obtain video of at least a portion of a surroundings of said handheld mobile computerized device, thereby producing video images of a present appearance of said tour real estate property;

further using said video camera and said at least one processor to simultaneously show both location and orientation adjusted images pertaining to said at least one possible future remodeling change of said tour real estate property during a real-world tour of said property; and also using said at least one processor to display said video images of a present appearance of said tour real estate property on said user interface.

21. The method of claim 20, wherein simultaneous showing of both location and orientation adjusted images pertaining to said at least one possible future remodeling change of said tour real estate property, and said video images of a present appearance of said tour real estate property, are displayed on said user interface, during a real-world tour of said property, using said at least one processor, as at least one of non-transparent and semi-transparent overlays of said possible future remodeling change overlaid on said video images of a present appearance of said tour real estate property.

22. A computerized method comprising:

conducting real estate real-world tours using a handheld mobile computerized device comprising at least one processor, memory, a graphical user interface, at least one wireless transceiver, and position determining devices comprising at least a GPS receiver, an orientation sensor and an accelerometer, by:

using said at least one processor to load computer readable reference real estate property information pertaining to a real estate customer's reference real estate property and positions of said reference real estate property into said memory in a manner that said handheld mobile computerized device retains said reference real estate property information on at least one of a stand-alone basis and as part of a wireless networked system with external servers;

using said at least one processor to load computer readable comp real estate property information pertaining to a plurality of comp real estate property and positions of said plurality of comp real estate property into memory in a manner that allows said handheld mobile computerized device to retain said comp real estate property information on at least one of a stand-alone basis and as part of a wireless networked system with external servers;

for tour real estate property comprising at least one of said reference real estate property and comp real estate property, using said processor to display at least some information pertaining to said tour real estate property on said user interface;

further using said user interface to define real estate customer user customized comparable data comprising property specific values comprising at least one of numbers and images that describe said tour real estate properties, thereby allowing said real estate customers to evaluate multiple tour real estate properties and better understand how each said tour real estate property would meet the needs of said real estate customer;

further loading images comprising information pertaining to at least one possible future remodeling change of said tour real estate property into said memory;

using said position determining device to automatically, using said at least one processor, determine a location and orientation of said handheld mobile computerized device;

and displaying location and orientation adjusted images pertaining to said at least one possible remodeling change of said tour real estate property on said user interface during said real estate real-world tour.

23. The method of claim 22, wherein said position determining devices further comprise in addition to said GPS receiver, said orientation sensor and said accelerometer, at least one additional position determination sensing device selected from the group consisting of additional air pressure based altitude sensors, RFID tag sensors, NFC tag sensors, WiFi address based position sensors, cell-phone tower triangulation based position sensors, other wireless transmitter triangulation sensors, sound sensors, QR code sensors, bar code based sensors, BlueTooth transceiver based position sensors, gyroscope based sensors, and step counter based sensors.

24. The method of claim 22, wherein said at least one reference property and said plurality of comp real estate property have, on an individual basis, a plurality of Key Site Driver (KSD) numeric descriptors describing their characteristics;

said method further comprising entering a plurality of different KSD variables for ideal version(s) of said at least one reference property into the user interface of said handheld mobile computerized device, and further using said user interface to define relative importance coefficients for each individual KSD variable in said plurality of KSD variables, thus creating and using said at least one processor to enter into said memory a KSD function that produces a property specific KSD number that describes said reference and comp real estate properties;

at least some of said KSD variables being subjectively determined and subjectively given relative importance coefficients by said real estate customer;

further using said at least one processor to ensure that a sum of all of the relative importance coefficients in said plurality of KSD's variables is equal to 100%;

further using said user interface and said at least one processor to, for at least one tour real estate property, assign values to at least some of said KSD variables and store these values into memory, and using said processor and said KSD function to create at least one KSD number that describes a tour real estate property.

25. The method of claim 22, wherein, when the position of said handheld mobile computerized device is at the position of said tour real estate property, and said tour real estate property is a multi-story property, using said position determining devices and said at least one processor to automatically determine an altitude and story level of said handheld mobile computerized device;

using said story level of said handheld mobile computerized device and said at least one processor to retrieve real estate property information pertaining to at least one of floor plans and property information for any of a plurality of stories of said tour real estate property that encompasses said altitude; and displaying said at least one of floor plans and property information for said any of said plurality of stories on said user interface during a real-world tour of said property.

26. The method of claim 25, wherein said handheld mobile computerized device additionally comprises at least one video camera;
   said at least one video camera is configured to obtain video of at least a portion of a surroundings of said handheld mobile computerized device, thereby producing video images of a present appearance of said tour real estate property;
   further using said video camera, said images comprising information pertaining to at least one possible future remodeling change of said tour real estate property, and said at least one processor to simultaneously show both location and orientation adjusted images pertaining to said at least one possible future remodeling change of said tour real estate property during a real-world tour of said property; and
   also using said at least one processor to display said video images of a present appearance of said tour real estate property on said user interface.

27. The method of claim 26, wherein simultaneous showing of both location and orientation adjusted images pertaining to said at least one possible future remodeling change of said tour real estate property, and said video images of a present appearance of said tour real estate property, are displayed on said user interface, using said at least one processor, as at least one of non-transparent and semi-transparent overlays of said possible future remodeling change overlaid on said video images of a present appearance of said tour real estate property during a real-world tour of said property.

28. A computerized method comprising:
   conducting real estate real-world tours using a handheld mobile computerized device comprising at least one processor, memory, a graphical user interface, and at least one wireless transceiver, and at least one location determining device, by:
   using said at least one processor to load computer readable reference real estate property information pertaining to a real estate-customer's reference real estate property and positions of said reference real estate property into said memory in a manner that said handheld mobile computerized device retains said reference real estate property information on at least one of a stand-alone basis and as part of a wireless networked system with external servers;
   using said at least one processor to load computer readable comp real estate property information pertaining to a plurality of comp real estate property and positions of said plurality of comp real estate property into memory in a manner that allows said handheld mobile computerized device to retain said comp real estate property information on at least one of a stand-alone basis and as part of a wireless networked system with external servers;
   for tour real estate property comprising at least one of said reference real estate property and said a plurality of comp real estate property, using said processor and said at least one location determining device to display at least some information pertaining to said tour real estate property on said user interface according to a location of said handheld mobile computerized device during said real estate real-world tour;
   further using said user interface to define real estate customer user customized comparable data comprising property specific values comprising at least one of numbers and images that describe said tour real estate properties, thereby allowing said real estate customers to evaluate multiple tour real estate properties and better understand how each said tour real estate property would meet the needs of said real estate customer;
   wherein said at least one location determining device further comprises position determining devices comprising at least a GPS receiver, an orientation sensor and an accelerometer;
   wherein, when the position of said handheld mobile computerized device is at the position of said tour real estate property, and said tour real estate property is a multi-story property, using said position determining devices and said at least one processor to automatically determine an altitude and story level of said handheld mobile computerized device;
   using said story level of said handheld mobile computerized device and said at least one processor to retrieve real estate property information pertaining to floor plans for any of a plurality of stories of said tour real estate property that encompasses said altitude; and
   during a real-world tour of said property, displaying said floor plans for said any of said plurality of stories on said user interface.

* * * * *